US005537101A

United States Patent [19]

Nakajima et al.

[11] Patent Number: 5,537,101

[45] Date of Patent: Jul. 16, 1996

[54] TIME DATA RECEIVING APPARATUS

[75] Inventors: Shuji Nakajima, Kunitachi; Nobuyuki Shiina, Tokyo; Makoto Nakagawa; Hideki Ogawa, both of Akishima, all of Japan

[73] Assignee: Casio Computer Co., Ltd., Tokyo, Japan

[21] Appl. No.: 344,160

[22] Filed: Nov. 23, 1994

[30] Foreign Application Priority Data

Dec. 7, 1993 [JP] Japan .................................... 5-339894
Dec. 7, 1993 [JP] Japan .................................... 5-339895

[51] Int. Cl.$^6$ ...................................................... H04Q 1/00

[52] U.S. Cl. ............................ 340/825.210; 340/825.440; 368/47

[58] Field of Search ............................ 340/825.21, 825.2, 340/825.44, 825.22, 825.57; 368/47

[56] References Cited

U.S. PATENT DOCUMENTS 4,845,491 7/1989 Fascenda et al. .................. 340/825.44
4,894,649 1/1990 Davis ................................. 340/825.44
5,083,123 1/1992 Ganter et al. ....................... 340/825.57
5,225,826 7/1993 DeLuca et al. ..................... 340/825.44

FOREIGN PATENT DOCUMENTS 0305200 3/1989 European Pat. Off. .
0308881 3/1989 European Pat. Off. .
0619685 10/1994 European Pat. Off. .
4304321 8/1993 Germany .

OTHER PUBLICATIONS

Horological Journal, Vol. 130, No. 13, Jul. 1988, Ashford GB, pp. 7–8–22, David J. Boulin: "Domestic Radio Controlled Clocks".

*Primary Examiner*—Brian Zimmerman
*Assistant Examiner*—Edwin C. Holloway III
*Attorney, Agent, or Firm*—Frishauf, Holtz, Goodman, Langer & Chick

[57] ABSTRACT

When the current time data in current time counting device has been corrected on the basis of the current time data transmitted over radiowaves, it is judged whether or not an alarm time is present between the time data before correction and the time data after correction. If an alarm time is present, the user is informed of the alarm time. This avoids the problem of failing to inform the user of the alarm time at that day. Furthermore, the correspondence between the current time data in the current time counting device and the time data in different functional device is prevented from changing as follows when the current time data has been corrected on the basis of the received time data, the time data in the different functional device is also corrected as much as the same correction time, or while the different functional device is operating, the time correcting operation is prevented from being carried out even if the time correction timing has been reached.

8 Claims, 10 Drawing Sheets

FIG.6

| | |
|---|---|
| MR | Fc |
| X1 | D1 |
| X2 | D2 |
| X3 | D3 |
| X | D |
| KT | KS |
| SY | Fs |

TIME DATA RECEIVING APPARATUS

BACKGROUND OF THE INVENTION

1. Field of the Invention

This invention relates to a time data receiving apparatus which receives the radiowaves containing a time code, extracts time data from the radiowaves, and corrects the time on the basis of the time data.

2. Description of the Related Art

At present, in Germany, England, Switzerland, Japan, etc., where the radiowaves containing a time code are being transmitted, radio-controlled timepieces have been put to practical use which receive the radiowaves, extract time data from the radiowaves, and corrects the current time data in the current time count circuit on the basis of the time data.

Furthermore, for example, a radio-controlled timepiece provided with an alarm function that goes off at the alarm time previously set has been disclosed in U.S. Pat. No. 5,083,123.

In such a radio-controlled timepiece with an alarm function, the alarm time data previously set is compared with the current time data in the current time count circuit every minute, and the alarm is given when they coincide with each other.

Therefore, even when a radiowave correction timing has occurred immediately before the current time data in the current time count circuit reaches the alarm time data, and the received accurate time data becomes the time data behind the alarm time, this time data will still be used to correct the current time data in the current time count circuit. As a result, the alarm time has passed, so that the coincidence of the alarm time data with the current time data in the current time count circuit cannot be sensed, and consequently the user is not informed of the alarm time.

The idea has been proposed that such a radio-controlled timepiece is provided with a timer 10 function of informing the user when the preset time has been reached.

A case will be considered where the elapsed time is measured using a radio-controlled timepiece with such a timer function.

For example, it is assumed that the user plans to start specific work at 4:50 p.m. and end at 5:20, sets the timer for 30 minutes, and starts the timer function at 4:50 to inform him at 5:20.

In the case where the radiowaves containing a time code is received at 5:00, the time data is extracted from the radiowaves, and the current time data in the current time count circuit is corrected on the basis of the time data, when the user is informed after the time set in the timer has elapsed, the current time data in the current time count circuit is other than 5:20 and consequently the time different from 5:20 is displayed. For this reason, the user may think that he must have set the wrong time in the timer, any time other than 30 minutes, or he may doubt the accuracy of the radio-controlled timepiece with the timer function.

SUMMARY OF THE INVENTION

An object of the present invention is to provide a time data receiving apparatus which can avoid the inconveniences of a function different from a current time counting function which result from the current time data in a current time count circuit being corrected on the basis of the time data transmitted over the radiowaves.

Another object of the present invention is to provide a time data receiving apparatus which can avoid the problem of failing to inform the user of the alarm time on that day because the current time data in a current time count circuit is corrected on the basis of the time data transmitted over the radiowaves.

Still another object of the present invention is to provide a time data receiving apparatus which can avoid the change of the correspondence between the current time data and the time data in a different functional means resulting from the current time data in a current time count circuit being corrected during the operation of the separate functional means for obtaining the time data different from the current time data.

To accomplish the foregoing objects, a time data receiving apparatus according to a first aspect of the invention comprises current time counting means for counting the current time data, alarm time data storage means for storing the alarm time data, coincidence sensing means for comparing the current time data in the current time counting means with the alarm time data to sense the coincidence between them, first informing means for performing an informing operation when the coincidence has been sensed at the coincidence sensing means, receiving means for receiving the radiowaves including time data and obtaining the reception time data from the radiowaves, correction means for correcting the current time data in the current time counting means on the basis of the reception time data obtained at the receiving means, judging means for judging whether or not the alarm time data is present between the time data before correction and the time data after correction, when the current time data in the current time counting means has been corrected by the correction means, and second informing means for performing an informing operation when the judging means judges the alarm time data as being between the time data before correction and the time data after correction.

To accomplish the foregoing objects, a time data receiving apparatus according to a second aspect of the invention comprises current time counting means for counting the current time data, receiving means for receiving the radiowaves including time data and obtaining the reception time data from the radiowaves, correction means for correcting the current time data in the current time counting means on the basis of the reception time data obtained at the receiving means, different functional means for obtaining the time data different from the current time data, correction time sensing means for sensing the correction time (the corrected amount of time) when the current time data in the current time counting means has been corrected by the correction means, and compensation means for compensating the time data in the different functional means with the correction time sensed at the correction time sensing means.

To accomplish the foregoing objects, a time data receiving apparatus according to a third aspect of the invention comprises current time counting means for counting the current time data, receiving means for receiving the radiowaves including time data and obtaining the reception time data from the radiowaves, correction means for correcting the current time data in the current time counting means on the basis of the reception time data obtained at the receiving means, different functional means for obtaining the time data different from the current time data, switch means for controlling the start and stop of the operation of the different functional means, and disabling means for disabling the correction means during the time when the different functional means is operating as a result of the operation of the switch means.

With the configuration according to the first aspect of the invention, when the current time data in the current time count means is corrected on the basis of the received time data, it is judged whether or not there is an alarm time is present between the time data before correction and the time data after correction. If an alarm time is present between them, the user is informed of the alarm time. This avoids the problem of failing to inform the user of the alarm time on that day because the current time data in the current time count circuit has been corrected.

With the configuration according to the second aspect of the invention, because the time data in the different functional means is also corrected as much as the same correction time when the current time data in the current time count means has been corrected on the basis of the received time data, it is possible to prevent the change of the correspondence between the current time data in the current time count means and the time data in the different functional means.

With the configuration according to the third aspect of the invention, because the time correction operation is prevented from being carried out during the operation of the different functional means, even if the time correction timing has been reached, it is possible to prevent the change of the correspondence between the current time data in the current time count means and the time data in the different functional means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 6 shows the structure of the RAM of FIG. 6;

DETAILED DESCRIPTION OF THE PREFERRED EMBODIMENTS

Referring to FIGS. 1 to 4, a time data receiving apparatus according to a first embodiment of the present invention will be explained.

Figure 1:
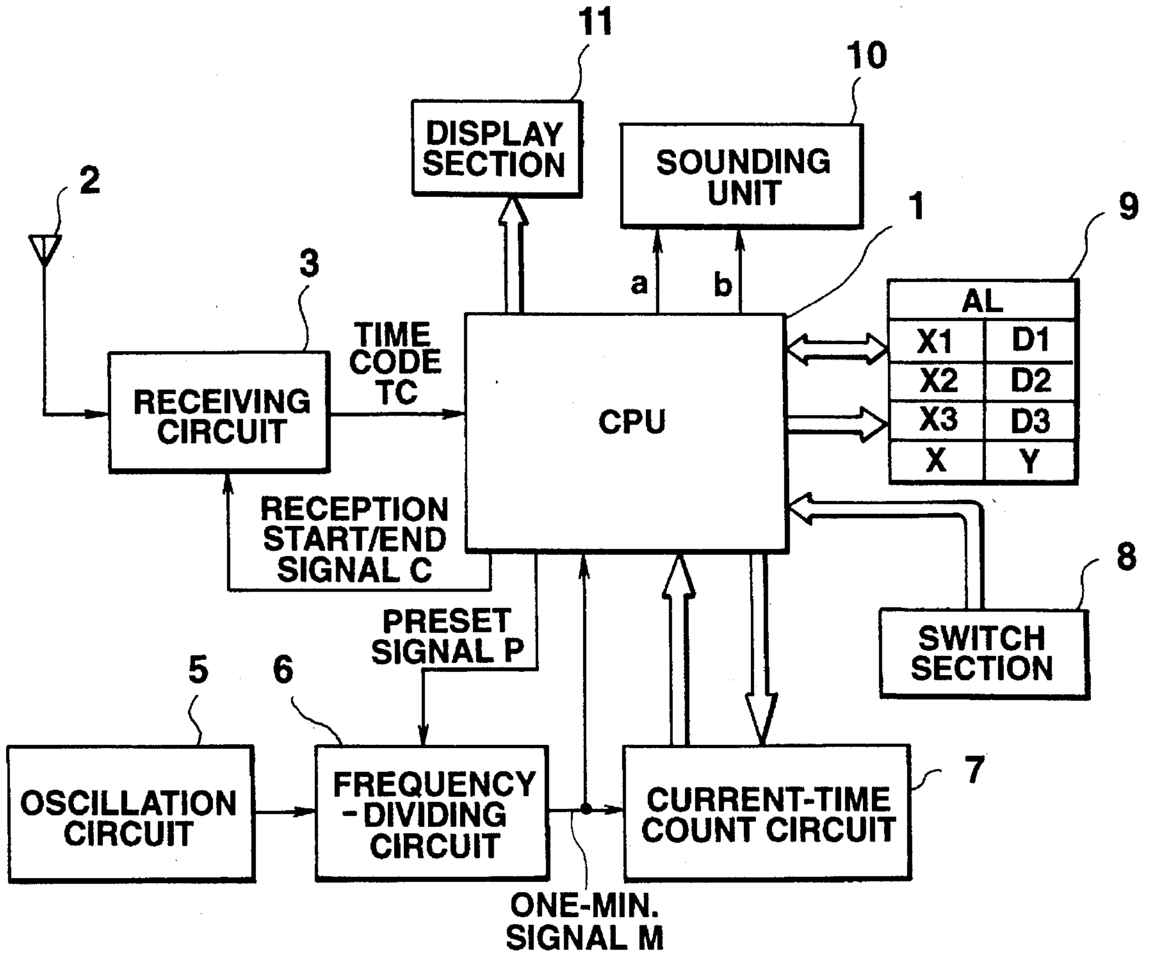
FIG. 1 is a block diagram of a time data receiving apparatus according to a first embodiment of the present invention.

FIG. 1 is a circuit diagram of the time data receiving apparatus according to the first embodiment.

In the figure, there is a CPU 1 in the center, to which the other circuit sections are connected. The CPU 1 is a control circuit section that processes the transmitted data and also sends control signals to the circuits connected thereto to control them.

An antenna 2 receives the transmitted radiowaves, converts them into electric signals, and transmits them to a receiving circuit 3. The receiving circuit 3 is a superheterodyne receiving circuit, which starts to operate when receiving a reception start/end signal C from the CPU 1, selects an electric signal of a specific frequency from the electric signals supplied from the antenna 2, obtains time code TC from the signal, and sends it to the CPU 1. Thereafter, the receiving circuit receives the reception start/end signal C and stops its operation.

Specifically, the receiving circuit 3 comprises a tuning circuit that extracts the signal of the specific frequency from the electric signals supplied from the antenna 2, a high-frequency amplifying circuit that amplifies the extracted specific-frequency signal, a PLL frequency synthesizer that is used as a local oscillator, a mixer that mixes the signal amplified at the high-frequency amplifying circuit with the signal from the PLL frequency synthesizer, a band-pass filter that extracts a desired intermediate-frequency signal from the signal supplied from the mixer, a detecting circuit that obtains a base band signal from the intermediate-frequency signal extracted at the band-pass filter, and an A/D converting circuit that converts the base band signal obtained at the detecting circuit into a digital signal and sends it as the time code TC to the CPU 1.

An oscillation circuit 5 is a circuit section that always sends a signal of a constant frequency. A frequency-dividing circuit 6 is a circuit section which counts the signal from the oscillation circuit 5, and sends a one-minute signal M to a current-time count circuit 7 and the CPU 1 each time the count has reached the value corresponding to one minute, and which increases the count by one second each time it receives the preset signal P from the CPU 1. The current-time count circuit 7 is a circuit section which counts the one-minute signal M from the frequency-dividing circuit 6 to obtain the current time data, that is, the date data on that day, the hour data and minute data at the present moment, supplies these data to the CPU 1, and which corrects the current time data on the basis of the time data from the CPU 1.

A switch section 8 is a circuit section which is provided with various switches and sends the corresponding switch input signal to the CPU 1 when any one of those switches is operated.

A RAM 9 is a circuit section which stores the data from the CPU 1 and sends the stored data to the CPU 1 under the control of CPU 1.

In the RAM 9, an alarm time memory AL is a memory which stores the alarm time set by operating a switch in the switch section 8, reception time memories X1 to X3 are memories which receive time code TC every minutes three times consecutively after the hour and store the plural reception time data extracted from those codes, reception cumulative day count memories D1 to D3 are memories which store date data obtained by converting the cumulative day count data sent together with the plural reception time data stored in the reception time memories X1 to X3, a reception current time memory X is a memory which stores the time data at the time when one minutes has passed since the reception time data stored in the reception time memory X3, a count current time memory Y is a memory that temporarily stores the current time data (i.e., the current time data before correction) in the current-time count circuit 7 at that moment in correcting the current time data in the current-time count circuit 7.

A sounding unit 10 is a circuit section which generates alarm sound A (explained later) when receiving signal a from the CPU 1 and alarm sound B (explained later) when receiving signal b. A display section 11 is a circuit section which digitally displays the data from the CPU 1, such as the current time data in the current-time count circuit 7.

Figure 4:
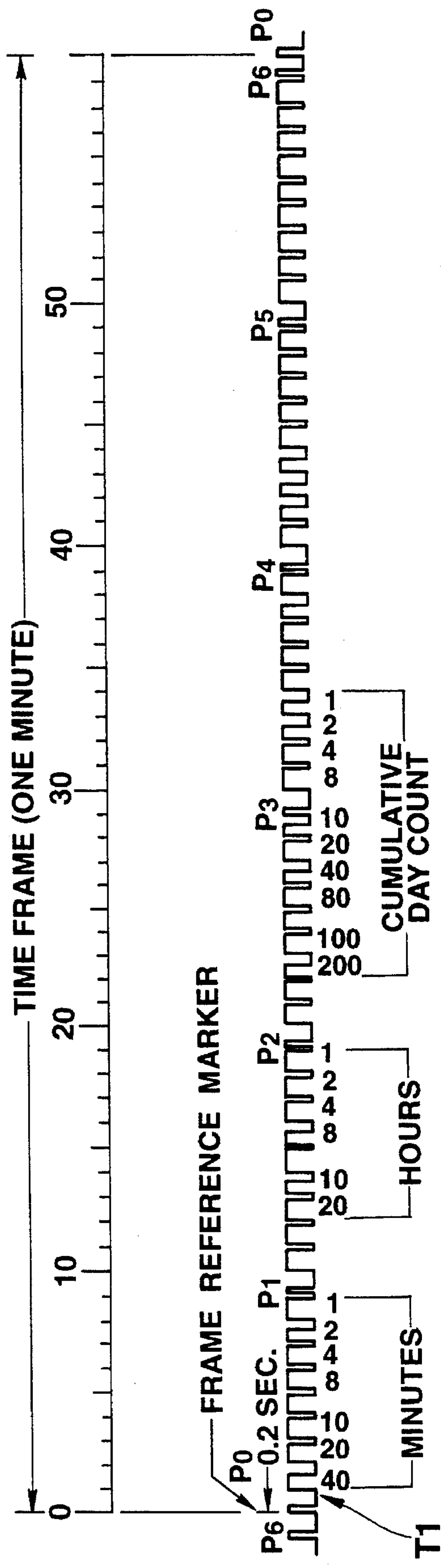
FIG. 4 illustrates a format of a time code.

FIG. 4 shows a time code transmitted from a transmitting station in Japan.

A time code whose format is as shown in FIG. 4 is transmitted in the form of amplitude-modulated 40-KHz long-wave standard frequency.

The Japan's time code is sent in the format lasting for one minute each time the digits of minutes in the accurate time are updated (i.e., every minute). As shown in FIG. 4, in the one-minute frame, a pulse which rises at the starting time, that is, at 0 second and whose width is 0.2 second is provided, and pulses which have the same width are provided at 9, 19, 29, 39, 49, and 59 seconds, respectively (in FIG. 4, they are indicated by symbols P0 to P6). Between frames, two pulses whose pulse width is 0.2 second are provided with an interval of nearly one second between the two pulses (i.e., the pulse indicated by P6 and that indicated by P0), which marks the start of a new frame. Of the two pulses, the latter is called a frame reference marker. Therefore, the point indicated by the frame reference marker or P0 at which a pulse rises is the accurate time that the digits of minutes of the current time have been updated.

Within the frame, the minutes and the hours of the time at the frame starting point and the cumulative day count (the number of days between the current time and January 1) are provided in binary-coded decimal in the range from one to nine seconds, the range from ten to nineteen seconds, and the range from twenty to forty seconds, respectively. In this case, code symbols "1" and "0" are represented by a pulse whose width is 0.5 second and a pulse whose width is 0.8 second, respectively. In the frame of FIG. 4, data on 18:42 on the 253rd day in the cumulative day count.

Hereinafter, the operation of the time data receiving apparatus of the first embodiment constructed as described above will be explained.

Figure 2:
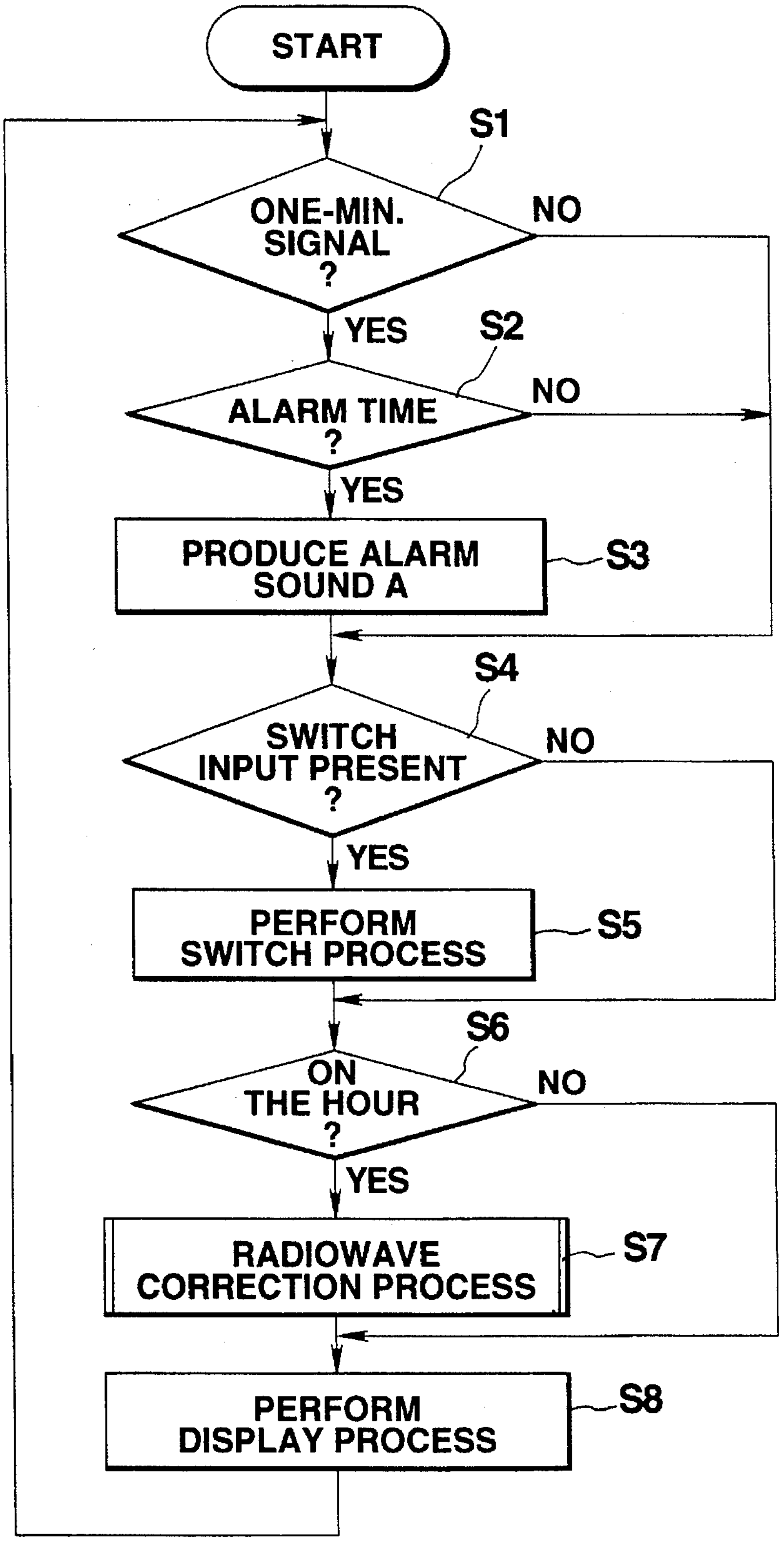
FIG. 2 is a general flowchart for the operation of the time data receiving apparatus of FIG. 1.
Figure 3:
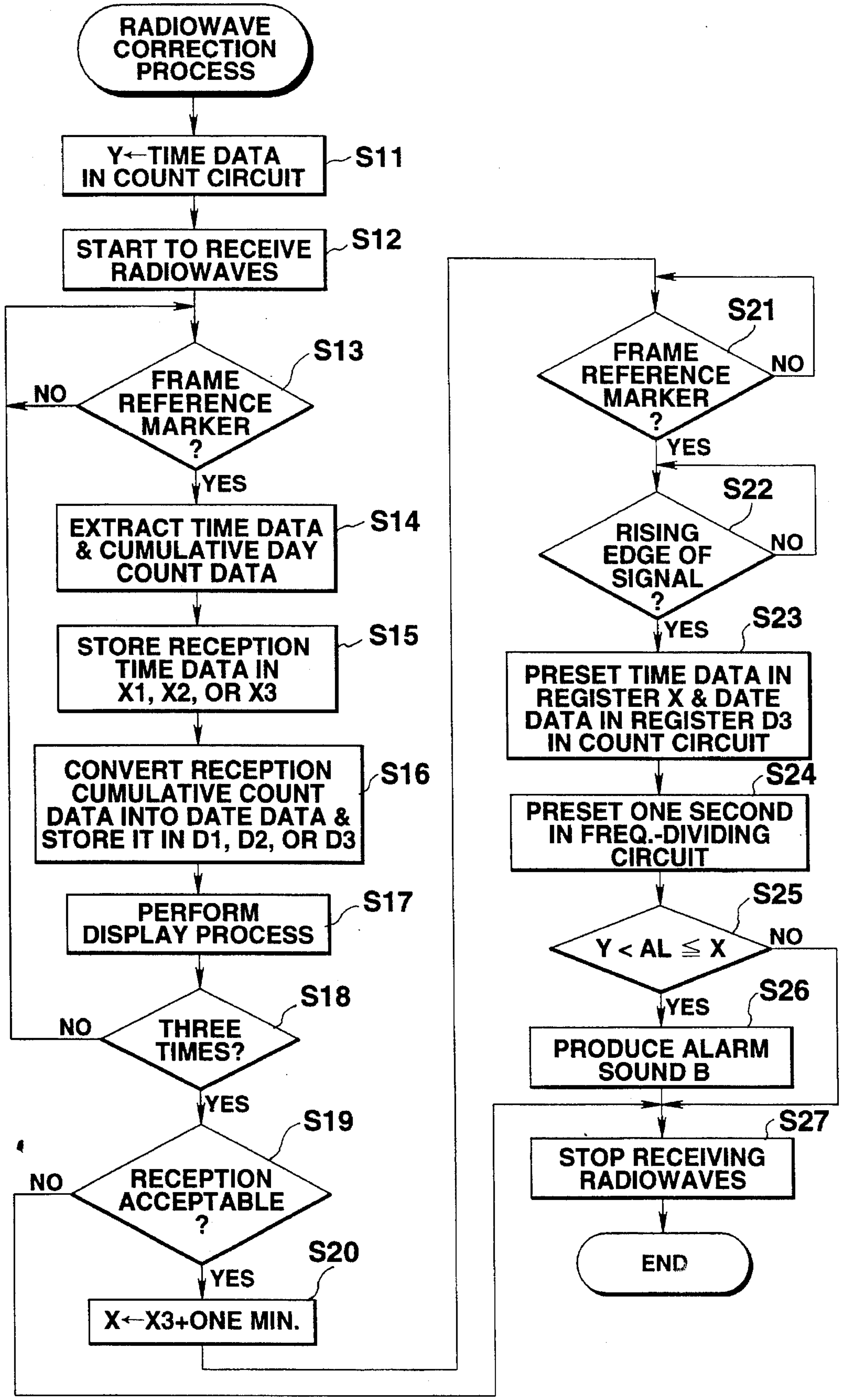
FIG. 3 is a detailed flowchart for the radiowave correction process at step S7 in the flowchart of FIG. 2.

FIG. 2 is a general flowchart of the operation. FIG. 3 is a detailed flowchart of the radiowave correction process at step 7 of FIG. 2.

In this embodiment, when power is turned on, control goes to step S1 of FIG. 2. At step S1, it is judged whether or not a one-minute signal M transmitted from the frequency-dividing circuit 6 has been received. If it has been received, control proceeds to step S2.

At step S2, it is judged whether or not the current time data in the current time count circuit 7 is equal to the alarm time data stored in the alarm time memory AL of the RAM 9. If it is equal to the alarm time data, control goes to step S3, where a signal a is sent to the sounding unit 10, which is then caused the unit to produce alarm sound A for 30 seconds, thereby informing the user of a state that the alarm time has been reached. After the process at step S3 has been completed, or when it is judged at step S1 that a one-minute signal M has not been received, or when it is judged at step S2 that the current time data in the current-time count circuit 7 is not equal to the alarm time data, control proceeds to step S4, where it is judged whether or not switch input has been performed by operating any switch in the switch section 8. If switch input has been performed, control goes to step S5, where the corresponding switch process is carried out, and thereafter control proceeds to step S6. If switch input has not been effected, control goes from step S4 to step S6 directly. At step S6, it is judged whether or not the current time in the current-time count circuit 7 is on the hour (the time whose minute digits and second digits are all zero like one o'clock, two o'clock, three o'clock . . . ). If it is on the hour, control goes to step S7, where a radiowave correction process (explained later) is carried out, and thereafter control goes to step S8. If it is judged at step S6 that it is not on the hour, control proceeds from step S6 to step S8 directly. At step S8, the current time data in the current-time count circuit 7 etc. is digitally displayed on the display section 11, and thereafter control returns to step S1. From this point on, the operations as described above will be repeated.

Hereinafter, the radiowave correction process (step S8) executed every hour on the hour will be explained. As mentioned above, FIG. 3 illustrates the radiowave correction process in detail. Specifically, when the current time data in the current-time count circuit 7 has reached the hour, and the correction process starts, the current time data in the current-time count circuit 7 is first stored in the count current-time memory Y of the RAM 9 at step S11. Then, at step S12, a reception start/end signal C is sent to the receiving circuit 3, which is then caused to start a receiving operation. Also at step S12, time code TC transmitted from the receiving circuit 3 is taken in. Then, at step S13, a check is made to see if the frame reference marker is present in the transmitted time code TC. This action is repeated until the frame reference marker has been received. When the frame reference marker is found, control goes from step S13 to step S14, where the reception time data (i.e., minute and hour data) and the reception cumulative day count data are extracted from the time code TC transmitted immediately after the frame reference marker. At step S15, the reception time data is stored in the reception time memory X1 of the RAM 9. Then, control proceeds to step S16, where the reception cumulative day count data is converted into date data (data on the month and the day of the month), and the resulting date data is stored in the reception cumulative day count memory D1 of the RAM 9. Then, at step S17, the process of digitally displaying the current time data in the current-time count circuit 7 etc. on the display section 11 is carried out. Thereafter, control goes to step S18. At step S18, it is judged that the frame reference marker (transmitted at intervals of one minute as described earlier) has not been sensed three times yet since the reception start/end signal C was sent to the receiving circuit 3, which then started reception (i.e., the operation of extracting three different types of reception time data at intervals of one minute has not been finished). Then, control returns to step S13.

After control has returned to step S13 as described above, a frame reference marker transmitted after the frame reference marker (hereinafter, referred to as a first frame reference marker), that is, a frame reference marker transmitted after one minuted has elapsed since the first frame reference marker was transmitted (hereinafter referred to as a second frame reference marker), is searched for from the time codes TC transmitted one after another at step S13. When the second marker reference marker is found, control goes to step S14. At step S14, the reception time data and the reception cumulative day count data are extracted from the time code TC following the second frame reference marker. At step S15, the reception time data is stored in the reception time memory X2. Then, control proceeds to step S16, where the reception cumulative day count data is converted into date data, which is stored in the reception cumulative day count memory D2. Thereafter, at step S17, the current time data in the current-time count circuit 7 etc. are displayed on the display section 11. Then, control goes to step S18, where it is judged that the frame reference marker has not been sensed three times yet since the receiving operation was started as mentioned earlier, and then control returns to step S13.

After control has returned to step S13, a frame reference marker transmitted after the second frame reference marker (hereinafter, referred to as a third frame reference marker) is searched for from the time codes TC transmitted one after another at step S13. When the third marker reference marker is found, control goes from step 13 to step S14, where the reception time data and the reception cumulative day count data are extracted from the time code TC following the third frame reference marker. At step S15, the reception time data is stored in the reception time memory X3. Then, control proceeds to step S16, where the reception cumulative day count data is converted into date data, which is stored in the reception cumulative day count memory D3. Thereafter, at step S17, the current time data in the current-time count circuit 7 etc. are displayed on the display section 11. Then, control goes to step S18, where it is judged that the frame reference marker has been sensed three times already since the receiving operation was started, and then control returns to step S19.

After control has arrived at step S19, it is judged here whether or not the reception has been carried out properly. Specifically, it is judged whether or not the three reception cumulative day count data obtained in the reception and stored in the reception time memories X1 to X3 are delayed one after another for one minute, and whether or not the three date data stored in the reception cumulative day count memories D1 to D3 are the same. If it is judged that the plural reception time data in the reception time memories X1 to X3 are delayed one after another for one minute and the three date data in the reception cumulative day count memories D1 to D3 are the same, and that the current reception has been performed properly, control goes to step S20, where the time data obtained by adding one minute to the reception time data stored in the reception time memory X3 is stored in the reception current time memory X (the reason why one-minute-added time data is stored in the reception current time memory X is that the operation of correcting the current time data in the current time count circuit 7 is effected only when the frame reference marker transmitted one minute after the transmission of the third frame reference marker, that is, the fourth frame reference marker, has arrived, which will be explained later). If it is judged at step S19 that the current reception has not been effected properly, control goes to step S27.

After the process at step S20 has been completed, control proceeds to step S21, where the fourth frame reference marker is waited for. When the fourth reference marker is sensed, control goes to step S22. At step S22, the rising edge of a pulse which rises one second after the rising of the fourth reference marker (i.e., the point in time indicated by T1 in FIG. 4) is waited for. When the rising edge is sensed, control goes to step S23. At step 23, the time data stored in the reception current time memory X (because this data is the time data at the time that the fourth frame reference marker rose as described earlier, it becomes one-second-old time data at present) and the reception date data stored in the reception cumulative day count memory D3 are forcibly set in the current time count circuit 7. At step S24, because the current time data set in the current time count circuit 7 at step 23 is one second older than, or one second behind, the current time, to correct this delay, a preset signal P is supplied to the frequency-dividing circuit 6 so that the next one-minute signal M may be transmitted 59 seconds later, not 60 seconds later, and the count in the frequency-dividing circuit 6 is forcibly increased by the value corresponding to one second.

After the process of correcting the current time data in the current time count circuit 7 using the time code TC received through the processes up to step S24 has been carried out, control goes to step S25. At step S25, it is judged whether or not the alarm time data stored in the alarm time memory AL is greater than the time data stored in the count current time memory Y (i.e., the time data in the current time count circuit 7 before correction at the time of starting the current reception) and is less than the time data in the reception current time memory X, or the time data in the current time count circuit 7 after correction (i.e., although alarm sound A has not been produced yet on that day, it is judged whether the current time data has reached the alarm time or has passed the alarm time as a result of correcting the current time data in the current time count circuit 7). When it is judged at step S25 that the alarm time data stored in the alarm time memory AL is greater than the time data stored in the count current time memory Y and is less than the time data in the reception current time memory X (in this case, attention is given to only the hour digits and minute digits of the time data, and the time is expressed in 24-hour representation), control goes to step S26, where signal b is sent to the sounding unit 10, which produces alarm sound B for 30 seconds only. In this case, hearing alarm sound B different from normal alarm sound A, the user can recognize that it is the alarm time sounding influenced by the operation of correcting the current time data in the current time count circuit 7.

After the process at step S26 has been finished, when it is judged at step S19 that the current reception has not been performed properly, or when it is judged at step S25 that the alarm time data in the alarm time memory AL exceeds the above range, control goes to step S27, where a reception start/end signal C is sent to the receiving circuit 3 to stop the current receiving operation, thereby terminating the radio-wave correction process.

The present invention is not limited to the above embodiment, but may be practiced or embodied in still other ways without departing form the spirit or essential character thereof. In the embodiment, each time the current time data in the current time count circuit 7 has reached the hour, a check is made to see if the current time data in the current time count circuit 7 has reached the alarm time data in the alarm time memory AL. If the alarm time data has been reached, the operation of producing alarm sound A (i.e., the processes at steps S2 and S3 in FIG. 2) is suspended (for a little longer than four minutes), the current time data (on the hour) in the current time count circuit 7 is set in the count current time memory Y, and the time data (the correct time data) on the time elapsed a little more than four minutes from the current time is set in the reception current time memory X. When the alarm time data stored in the alarm time memory AL is greater than the time data in the count current time memory Y and is less than the time data in the reception current time memory X (as mentioned earlier, attention is given to only the hours and minutes in the time data, and the time is expressed in 24-hour representation. The same holds true in the explanation below), alarm sound B is produced. Alarm sound B may be produced in a different manner. For instance, alarm sound B may be produced as follows: even after the hour, whether or not the current time data in the current time count circuit 7 has reached the alarm time data in the alarm time memory AL continues to be checked immediately before the current time data in the current time count circuit 7 is corrected using the time data in the reception current time memory X. If the alarm time data has been reached, alarm sound A is produced (e.g., the processes at steps S2 and S3 of FIG. 2 are inserted between steps S17 and S18 and between steps S22 and S23 of FIG. 3). After that, the operation is stopped. On the other hand, if the current time data in the current time count circuit 7 has not reached the alarm time data in the alarm time memory AL immediately before the correction, it is judged whether or not the alarm time in the alarm time memory AL is less than the time data in the current time count circuit 7 after correction (i.e., the time data in the reception current time memory X). Only when the former is less than the latter, alarm B is produced.

With the first embodiment, when the alarm time sounding has not been effected yet on that day and the preset alarm time data is within that day, it is judged whether or not the preset alarm time data is in the range before the time data in the current time count means after correction using the reception time data. If it is judged that the alarm time data is in the range, alarm time sounding is effected. Therefore, it is possible to avoid the problem of failing to inform the user of the alarm time on that day resulting from the operation of correcting the time data in the current time count circuit on the basis of the received time data.

Hereinafter, a second embodiment of the present invention will be explained.

Figure 5:
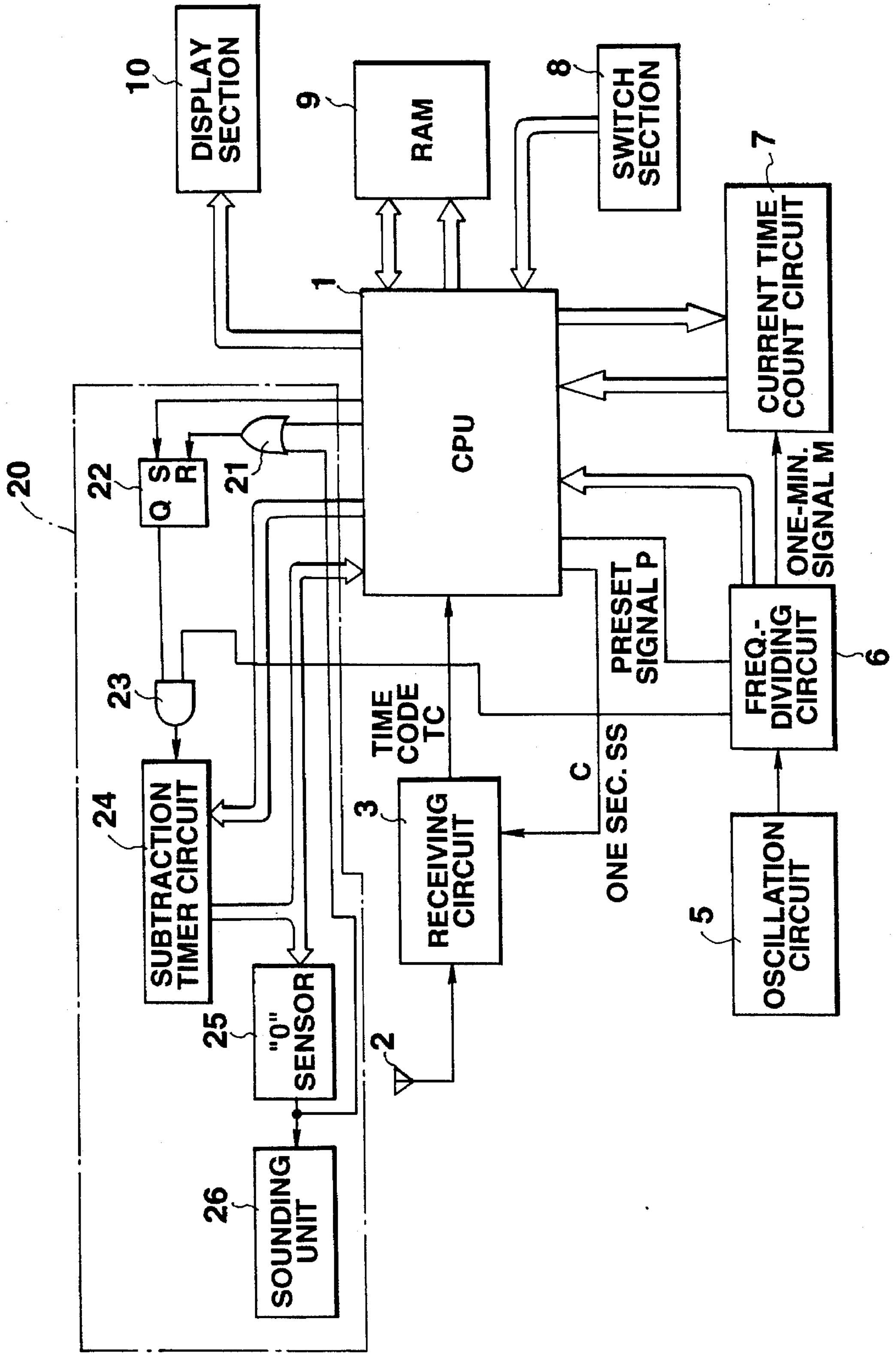
FIG. 5 is a block diagram of a time data receiving apparatus according to a second embodiment of the present invention.

FIG. 5 is a block diagram of a time data receiving apparatus of the second embodiment.

The circuit configuration of the second embodiment differs from that of the first embodiment of FIG. 1 in which the former is provided with a subtraction timer section 20.

The subtraction timer section 20 comprises an RS flip-flop 22, an AND gate 23, a subtraction timer circuit 24, a zero-second sensing circuit 25, and a sounding unit 26.

The RS flip-flop 22 is a circuit which, when receiving the set signal from a CPU 1, goes into a set state and supplies output Q to the AND gate 23, and which, when receiving the reset signal via an OR gate 21, goes into a reset state and stops supplying output Q.

The AND gate 23 is a circuit section which is enabled by output Q from the RS flip-flop 22 and supplies the one-second signal SS from a frequency-dividing circuit 6 to the subtraction timer circuit 24. The timer time from the CPU 1 is set in the subtraction timer circuit 24, which decreases the preset timer time by one second each time the one-second signal SS supplied via the AND gate 23 is received, and sends the timer time (i.e., the remaining time) at that point in time to the zero-second sensing circuit 25 and the CPU 1.

The zero-second sensing circuit 25 is a circuit which checks whether or not the timer time from the subtraction timer circuit 24 has reached zero, and when zero has been reached, supplies a sense signal to the sounding unit 26 and the OR gate 21.

The sounding unit 26 is a circuit section which, when receiving the sense signal from the zero-second sensing circuit 25, produces alarm sound for a specified period of time.

The OR gate 21 is a circuit section which supplies the sense signal from the zero-second sensing circuit 25 or the signal from the CPU 1 to the RS flip-flop 22 as the reset signal.

FIG. 6 shows the structure of a RAM 9. A mode register MR is a register for specifying a mode. When a "1" is set in the register, it specifies the timer mode in which a timer function is also used, and when a "0" is set in the register, it specifies the clock mode in which only a clock is used. A correction flag Fc is a flag for specifying whether or not the timer time in the subtraction timer circuit 14 should be corrected according to the correction time when the time data in the current time count circuit 7 has been corrected on the basis of the reception time code TC during the operation of the timer. When the flag has a value of "1", it specifies correction.

Reception time memories X1 to X3 are memories in which three reception time data (three reception time data differing from each other by one minute) obtained in a time correction operation, or the radiowave correction process (at step A4 in FIG. 7 explained later) are stored respectively. Reception cumulative day count memories D1 to D3 are memories in which the plural date data obtained by converting the cumulative day data sent together with the plural reception time data stored in the reception time memories X1 to X3, are stored respectively. A reception current time memory X is a memory in which the time data only one minute after the reception time data stored in the reception time memory X3 is stored. A reception current cumulative day count memory D is a memory in which the date data stored in the reception cumulative day count memory D3 is stored. A count hour-minute memory KT is a memory in which the hour-minute data in the current time count circuit 7 is stored immediately before the current time data in the current time count circuit 7 is corrected.

A count second memory KS is a memory in which the count data in the frequency-dividing circuit 6, or the data on the second digits of the current time, is stored immediately before the current time data in the current time count circuit 7 is corrected. A correction amount memory SY is a memory in which the amount of correction in the radiowave correction process (i.e., the time data indicating how much early or late the time data should be set for correction). A timer flag Fs is a flag in which a "1" is set during the timer operation of the subtraction timer circuit 14.

Hereinafter, the operation of the second embodiment thus constructed will be described.

Figure 7:
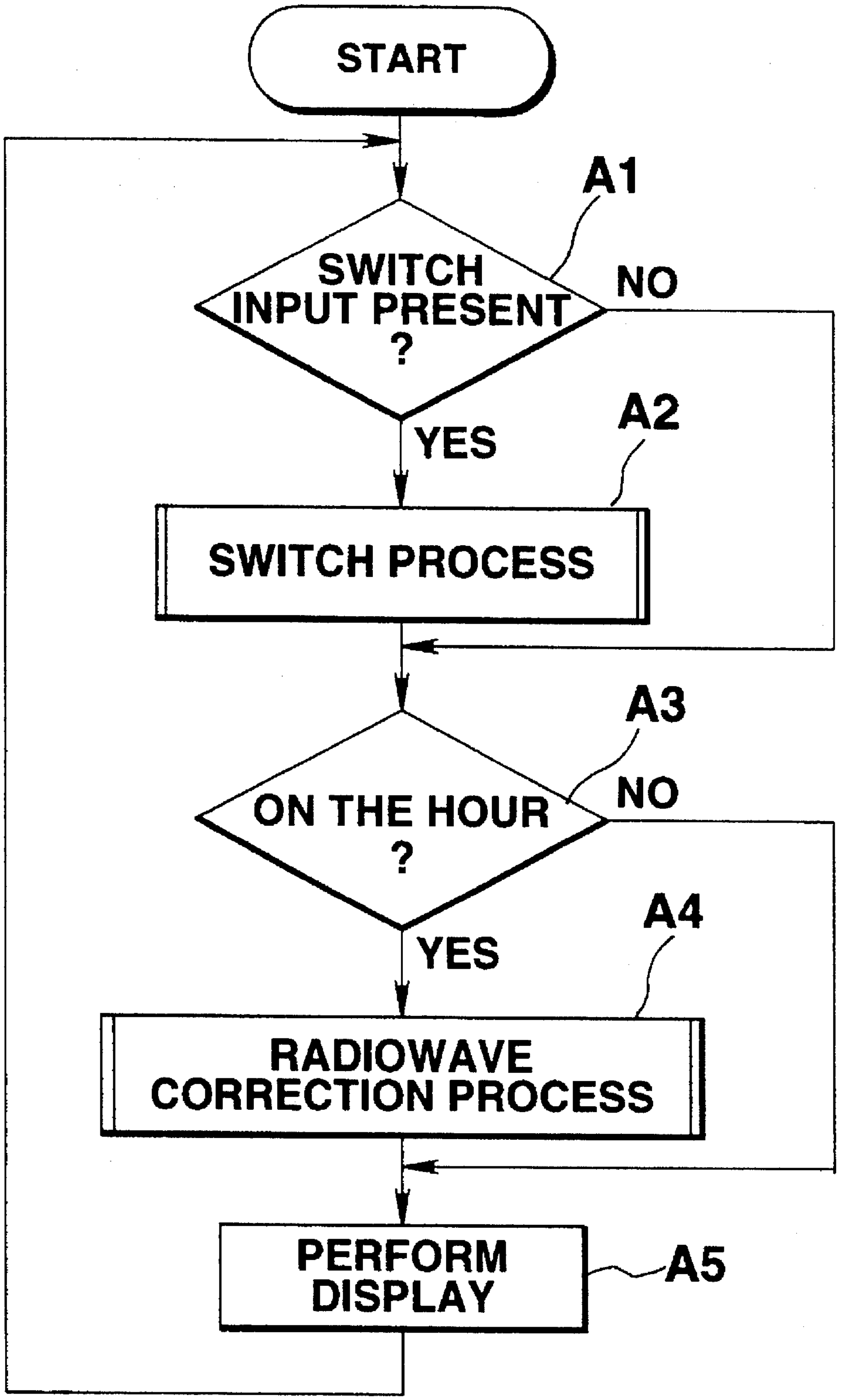
FIG. 7 is a general flowchart for the operation of the time data receiving apparatus of FIG. 5.
Figure 8:
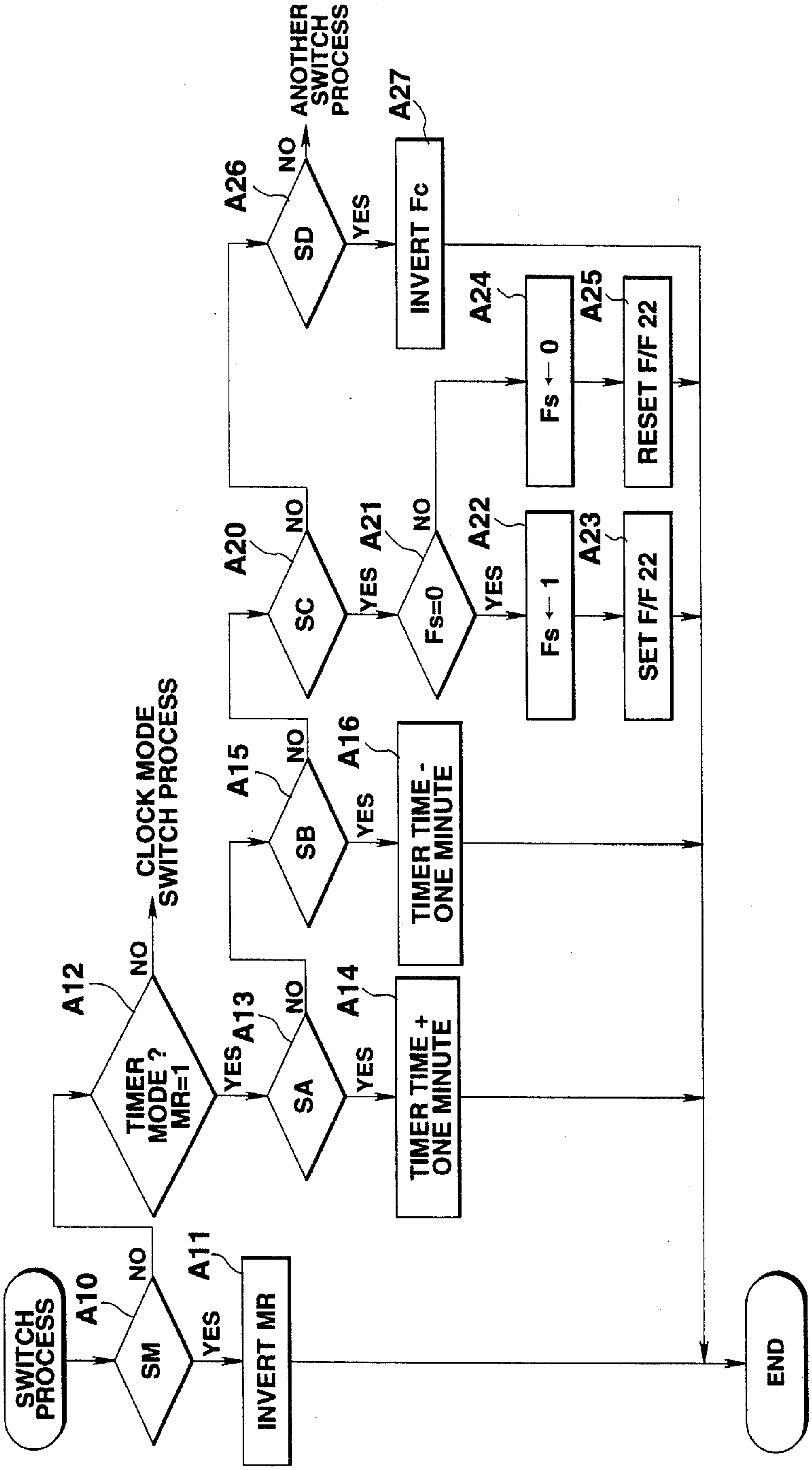
FIG. 8 is a detailed flowchart for the switching process at step A2 in the flowchart of FIG. 7.
Figure 9:
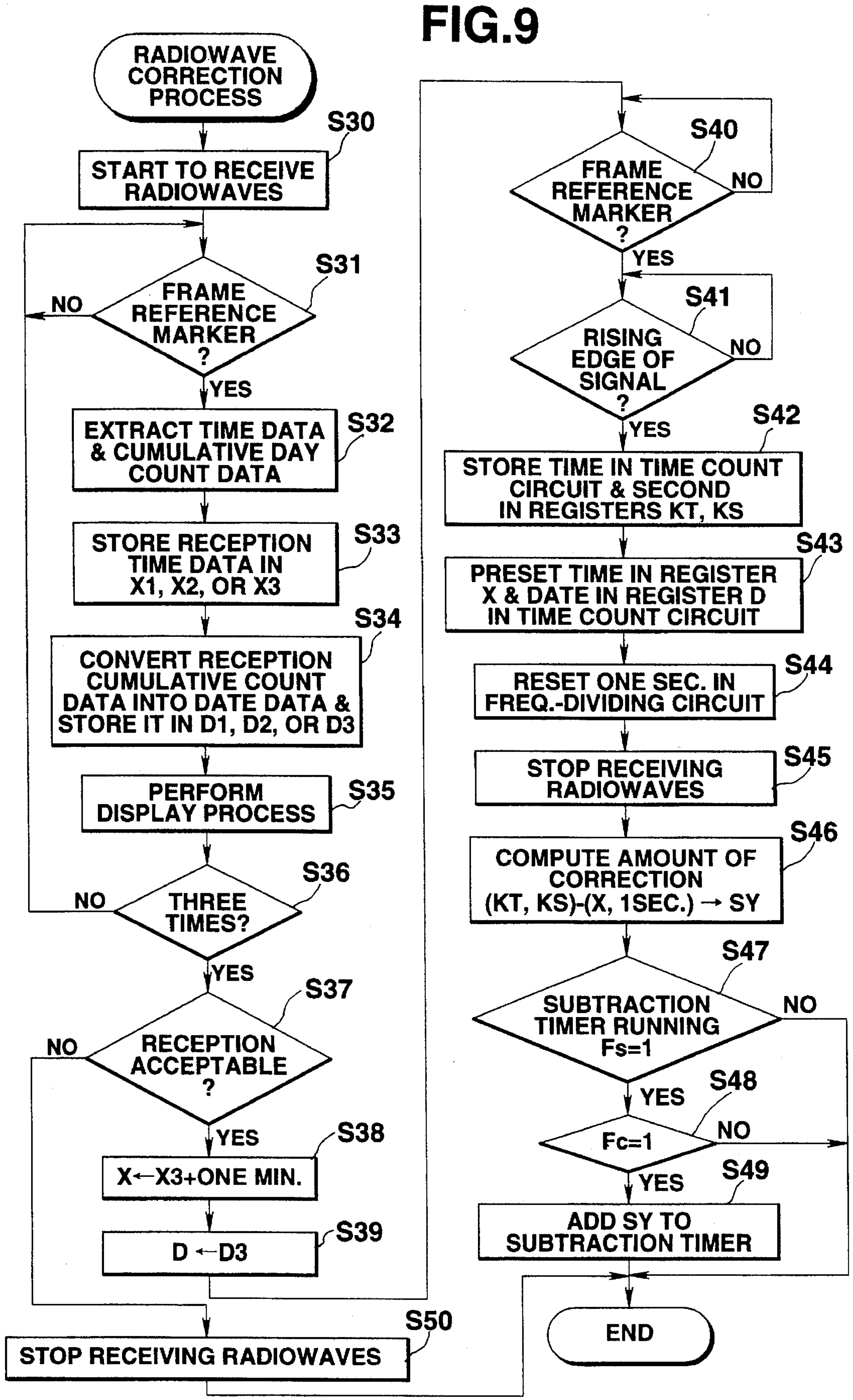
FIG. 9 is a detailed flowchart for the radiowave correction process at step A4 in the flowchart of FIG. 7.

FIG. 7 is a general flowchart for the operation of the second embodiment. FIG. 8 is a detailed flowchart for the switch process at step A2 in the flowchart of FIG. 7. FIG. 9 is a detailed flowchart for the radiowave correction process at step A4 in the flowchart of FIG. 7.

In this embodiment, as shown in FIG. 7, first at step A1, it is judged whether or not switch input has been performed by operating any switch in the switch section 8. If switch input has been performed, control goes to step A2, where the corresponding switch process is carried out, and thereafter control proceeds to step A3. If switch input has not been effected, control goes from step A1 to step A3 directly. At step A3, it is judged whether or not the current time in the current-time count circuit 7 is on the hour. If it is on the hour, control goes to step A4, where a radiowave correction process (explained in detail later) is carried out, and thereafter control goes to step A5. If it is judged at step A3 that it is not on the hour, control proceeds from step A3 to step A5. At step A5, the current time data in the current-time count circuit 7 etc. is digitally displayed on the display section 10, and thereafter control returns to step A1. From this point on, the operations as described above will be repeated.

Hereinafter, the operation in each mode will be described.

(a) the operation in the timer mode

It is assumed that the clock mode is switched to the timer mode to start a timer operation, and the radiowave correction process is carried out while the time elapsing is being measured, thereby correcting the current time data in the current time count circuit 7. On this assumption, the operation of the embodiment will be described.

To change from the clock mode to the timer mode, a mode switch SM in the switch section 8 is operated. The fact that a switch has been operated is sensed at step A1 in FIG. 7. Then, control goes to the switch process at step A2, or the flowchart of FIG. 8. At step A10, it is sensed that what has been operated is the mode switch SM, and then control proceeds to step All, where the value in the mode register MR is inverted from "0" to "1" to turn on the timer mode. Setting the timer time in the subtraction timer circuit 24 is effected by operating the timer time switches SA and SB in the switch section 8. At this time, each time the timer time switch SA is operated, control goes to the switch process (at step A2 in FIG. 7, or in the flowchart of FIG. 8). At step A10, it is judged that the mode switch SM has not been operated, and then control goes to step A12, where it is judged that the mode register MR has a "1" in it, meaning that the timer mode is already on. Next, control proceeds to step A13, where it is judged that what has been operated is the timer time switch SA. At step A14, the timer time set in the subtraction timer circuit 24 is increased by one minute. On the other hand, each time the timer time switch SB is operated, control goes from step A12 to step A13, where it is judged that what has been operated is not the timer time switch SA. Then, control proceeds to step A15, where the timer time set in the subtraction timer circuit 24 is decreased by one minute.

After the timer time has been set in the subtraction timer circuit 24, when the current time in the current time count circuit 7 is corrected on the basis of the reception time code TC, the user decides whether or not the timer time in the subtraction timer circuit 24 (i.e., the remaining time) should be corrected accordingly. If he decides to correct the time, he sets a "1" for the correction flag Fc. When the correction flag Fc has a value of "0", he operates the correction switch SD in the switch section 8 to change the value to "1". In this case, as described earlier, control goes to the switch process in FIG. 8. After the steps A10, A12, A13, and A15 have been carried out, control proceeds to step A20, where it is judged that the start/stop switch SC has not been operated, and then control goes to step A26. At this step, it is judged that what has been operated is the correction switch SD, and then control goes to step S27, where the correction flag Fc is inverted from "0" to "1".

After the preparation for use of the timer function has been made as mentioned above, the start/stop switch SC in the switch section 8 is operated with the timing of starting to measure the elapsed time with the subtraction timer circuit 24. At this time, the operation is sensed at step A20. At step A21, it is judged that the value of timer flag Fc is "0", and control goes to step A22. At step A22, a "1" is set for the timer flag Fs. Next, at step A23, a set signal is sent to the RS flip-flop 22, which is then placed in a set state. The output Q of the RS flip-flop 22 enables the AND gate 23 so that the one-second signal SS from the frequency-dividing circuit 6 may be supplied to the subtraction timer circuit 24 via the AND gate 23. From this time on, the subtraction timer circuit 24 decreases the preset time by one second each time it receives the one-second signal SS sent every second.

After the subtraction timer circuit 24 has started to measure the elapsed time, there is no switch operation. In addition, as long as the current time data in the current time count circuit 7 has not reached the hour, the following operations are repeated: control proceeds from step A1 to step A3 and to step A5 for the display process, where the current time data in the current time count circuit 7 and the timer time (i.e., the remaining time) in the subtraction timer circuit 24 are digitally displayed on the display section 10, and thereafter control returns to step A1.

As time has passed in repeating the above operations, when the current time data in the current time count circuit 7 has reached the hour, the fact is sensed at step A3 in FIG. 7, and control proceeds to step A4 for the radiowave correction process, or the flowchart of FIG. 9.

Once the radiowave correction process has started, first at step A30, a reception start/end signal C is sent to the receiving circuit 3, which then starts a receiving operation, and the time codes TC sent from the receiving circuit 3 are taken in.

The processes at the subsequent steps A31 to A36 are the same as those at steps S13 to S18 in the first embodiment. In those processes, three receiving operations are performed, with the result that the plural reception time data are stored in the reception time memories X1 to X3, and the plural reception cumulative day count data are stored in the reception cumulative day count memories D1 to D3.

Then, control goes to step A37. At step A37, it is judged whether or not the present reception has been performed properly. Specifically, it is judged whether or not the three reception time data stored in the reception time memories X1 to X3 are delayed one after another for one minute and whether or not the three date data stored in the reception cumulative day count memories D1 to D3 are the same. If it is judged that the plural reception time data in the reception time memories X1 to X3 are delayed one after another for one minute and the date data in the reception cumulative day count memories D1 to D3 are the same, and that the current reception has been performed properly, control goes to step A38, where the time data obtained by adding one minute to the reception time data stored in the reception time memory X3 is stored in the reception current time memory X. If it is judged at step A37 that the current reception has not been effected properly, control goes to step A50, where a reception start/end signal C is sent to the receiving circuit 3, which then stops the receiving operation, thereby terminating the radiowave correction process.

After the process at step A38 has been completed, control proceeds to step A39, where the date data in the reception current cumulative day count memory D3 is also stored in the reception cumulative day count memory D. Then, at step A40, the fourth frame reference marker is waited for. When the fourth reference marker is sensed, control goes to step A41. At step A41, the rising edge of a pulse that rises one second after the rising of the fourth reference marker (i.e., the point in time indicated by T1 in FIG. 4) is waited for. When the rising edge is sensed, control goes to step A42. At step A42, the plural time data (the hour and minute data) in the current time count circuit 7 are stored in the count hour-minute memory KT, and the second data in the frequency-dividing circuit 6 is stored in the count second memory KS. Then, at step A43, the time data stored in the reception current time memory X (because this data is the time data at the time that the fourth frame reference marker rose as described earlier, it becomes one-second-old time data at present) and the reception date data stored in the reception current cumulative day count memory D are forcibly set in the current time count circuit 7 as the current time data.

Next, at step A44, because the current time data set in the current time count circuit 7 at step A43 is one second older than, or one second behind, the current time, to correct this delay, the preset signal P is supplied to the frequency-dividing circuit 6 so that the next one-minute signal M may be transmitted 59 seconds later, not 60 seconds later, to forcibly increase the count in the frequency-dividing circuit 6 by the value corresponding to one second.

After the process at step A44 has been completed, control goes to step A45, where a reception start/end signal C is sent to the receiving circuit 3, which then stops its receiving operation. Next, at step A46, the hour and minute data and second data and the second data at the time one second after the time of the hours and minutes stored in the reception current time memory X are subtracted from the hour and minute data and the second data respectively stored in the count hour-minute memory KT and the count second memory KS to calculate the difference (the difference between the counts in the current time count circuit 7 before and after the present correcting operation), that is, the amount of correction. Additionally, the amount of correction is stored in the correction amount memory SY. Then, at step A47, it is verified that the value of timer flag Fs is "1" and the subtraction timer circuit 24 is in operation, and control proceeds to step A48. At this step, it is judged that the correction flag Fc has a value of "1", specifying that the timer time in the subtraction timer circuit 14 should also be corrected when the current time in the current time count circuit 7 has been corrected. Next, at step A49, the amount of correction stored in the correction amount memory SY is added to the timer time in the subtraction timer circuit 24 at that time (i.e., the remaining time) and then the radiowave correction process is terminated. When the value of timer flag Fs is "0" and the subtraction timer circuit 24 is not in operation, or when the value of correction flag Fc is "0" and the correction of the timer time in the subtraction timer circuit 24 is not specified, these facts are sensed at step A47 and step A48, respectively, and the radiowave correction process is terminated at the respective steps.

After the current time data in the current time count circuit 7 and the timer time (i.e., the remaining time) in the subtraction timer circuit 24 have been corrected in the radiowave correction process, control goes to step A15. At this step, the corrected current time data in the current time count circuit 7 and the corrected timer time in the subtraction timer circuit 24 are digitally displayed on the display section 10. Then, control returns to step A1.

As time has passed, and when the timer time (i.e., the remaining time) in the subtraction timer circuit 24 has reached 0, the zero-second sensing circuit 25 senses the fact, and sends a sense signal. The sounding unit 26 which has received the sense signal then produce alarm sound for a specified period of time. The sense signal is also supplied via the OR gate 21 to the RS flip-flop 22 as a reset signal. Receiving the reset signal, the RS flip-flop 22 goes into a reset state and stops supplying output Q. This disables the AND gate 23. As a result, from this time on, the one-second signal SS from the frequency-dividing circuit 6 is prevented from being supplied to the subtraction timer circuit 24, which then stops its operation.

Thereafter, the current time count circuit 7 counts the current time and corrects the current time data every hour on the hour.

To interrupt the measurement of the elapsed time by the subtraction timer circuit 24, the start/stop switch SC in the switch section 8 is operated at that time. This operation is sensed at step A20 in FIG. 8. At step A21, it is verified that the value of timer flag Fs is "1", not "0" and that the subtraction timer circuit 24 is measuring the elapsed time. At step A24, the value of timer flag Fs is set at "0", and then a reset signal is sent to the RS flip-flop 22 via the OR gate 21. Receiving the reset signal, the RS flip-flop 22 goes into a reset state, thereby causing the subtraction timer circuit 24 to stop its operation.

When the operation of the subtraction timer circuit 24 is interrupted, the correction of the timer time (the remaining time) in the subtraction timer circuit 24 is not effected even if the hour has been reached after the interruption and the reception correction process has been carried out (steps A47 to A49 in FIG. 9).

(b) The operation in the clock mode

To change from the timer mode to the clock mode, the mode switch SM is operated. In this case, the operation is sensed at step A10 in FIG. 8. Then, at step All, the value of mode register MR is inverted from "1" to "0" to turn on the clock mode. After the clock mode has turned on, the steps A1, A3 to A5, and A1 in FIG. 7 are repeated as long as no switch is operated. On the hour, control goes from step A3 to step A4 of the radiowave correction process, or the flowchart in FIG. 9, where the operation is carried out as described earlier. Because the operation is in the clock mode, not in the timer mode, the subtraction timer circuit 24 is not in operation and the value of timer flag Fs is "0". Therefore, at step A47 in FIG. 9, the radiowave correction process is terminated and consequently control does not proceed to step A49, with the result that the timer time in the subtraction timer circuit 24 is not corrected.

With the time data receiving apparatus according to the second embodiment, when the current time data in the current time count means is corrected by the correction means, the corrected time is sensed by the corrected time sensing means, the timer means is also corrected as much as the corrected time by the compensation means. Therefore, it is possible to avoid the following problem: the time in the current time count circuit disagrees with the timer end scheduled time during the alarm operation of the timer function, because the current time data in the current time count circuit has been corrected during the operation of the timer function.

Figure 10:
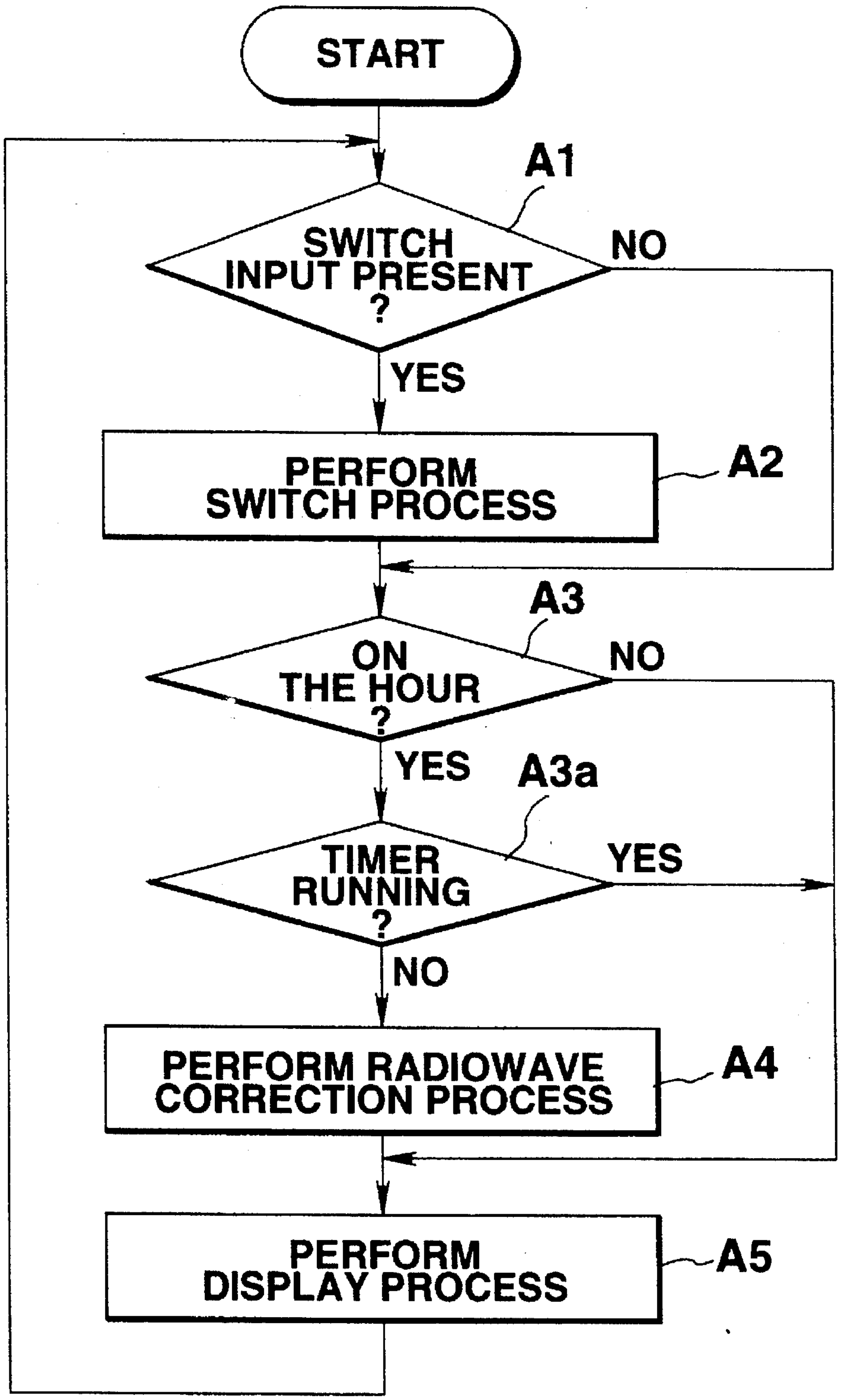
FIG. 10 is a general flowchart for the operation of the time data receiving apparatus according to a modification of the second embodiment.

FIG. 10 shows a modification of the second embodiment. The configuration of the modification is almost the same as that in FIGS. 5 and 6.

An overview of the operation of the modification is shown in a general flowchart of FIG. 10.

In comparison of the general flowchart of FIG. 10 with that of FIG. 7, they are almost the same, except that in FIG. 10, step A3*a* is inserted between step A3 and step A4.

Specifically, in the modification, a check is first made at step A1 to see if there has been a switch input signal. If a switch input signal has occurred, the corresponding switch process is executed at step A2. Then, control goes to step A3.

If there has been no switch input signal, control proceeds directly from step A1 to step A3.

At step A3, a check is made to see if the current time in the current time count circuit 7 has reached the hour. If it is on the hour, it is Judged at step A3*a* whether or not the subtraction timer circuit 24 is in operation. Only when the circuit is not in operation, the radiowave correction process of correcting the current time data in the current time count circuit 7 on the basis of the reception time code TC (the processes consisting only of the steps A30 to A45 in FIG. 8 in the previous embodiment) is executed.

After the radiowave correction process has been completed, when it has been Judged at step A3 that the current time in the current time count circuit 7 has not reached the hour, or when it has been judged at step A3*a* that the subtraction timer circuit 24 is in operation, control goes to step A5 of the display process, where the current time data in the current time count circuit 7 is digitally displayed on the display section 10. After the display process at step A5 has been executed, control returns to step A1. Thereafter, the similar processes are repeated.

Specifically, with the modification, as shown in steps A3*a* and A4, even if the hour has been reached, as long as the timer operation is going on at the subtraction timer circuit 24, the radiowave correction process, that is, the process of correcting the current time data in the current time count circuit 7 on the basis of the reception time data is not carried out. Therefore, it is possible to prevent the time in the current time count circuit from disagreeing with the timer end scheduled time during the informing operation of the timer function.

while in the second embodiment, the subtraction timer circuit has been used which decreases the preset timer time by one second every second, an addition timer circuit may be used which increases the timer time by one second every second, and informs the user of a time when the accumulated value has reached the preset value.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A time data receiving apparatus comprising: current time counting means for counting current time data;

alarm time data storage means for storing alarm time data;

coincidence sensing means for comparing the current time data in said current time counting means with said alarm time data to sense coincidence between them;

first informing means for informing an alarm time when coincidence has been sensed by said coincidence sensing means;

receiving means for receiving radiowaves including time data and for obtaining reception time data from the radiowaves;

correction means for correcting the current time data in said current time counting means on the basis of the reception time data obtained by said receiving means;

judging means for judging whether or not an alarm time corresponding to said alarm time data is not informed on that day and the current time data after correction exceeds the alarm time corresponding to said alarm time data, when the current time data in said current time counting means has been corrected by said correction means; and second informing means for performing an informing operation when said judging means judges that the alarm time corresponding to said alarm time data is not informed on that day and the current time data after correction exceeds the alarm time corresponding to said alarm time data.

2. A time data receiving apparatus according to claim 1, wherein said correction means corrects the current time data every hour on the hour.

3. A time data receiving apparatus according to claim 1, wherein said first and second informing means each produce different alarm sounds.

4. A time data receiving apparatus according to claim 1, wherein said correction means includes means for judging whether or not the time data has been received properly on the basis of intervals at which a plurality of reception time data have been obtained successively at said receiving means, and executes a correction of said current time data only when said correction means has judged that the time data has been received properly.

5. A time data receiving apparatus comprising:

current time counting means for counting current time data;

receiving means for receiving radiowaves including time data and for obtaining reception time data from the radiowaves;

correction means for correcting the current time data in said current time counting means on the basis of the reception time data obtained by said receiving means;

a start switch;

timer means for starting a countdown operation of preset time data in response to an operation of said start switch and for informing of an alarm time when the time data becomes zero;

correction time sensing means for sensing a correction time corresponding to a corrected amount of time when the current time data in said current time counting means has been corrected by said correction means; and compensation means for compensating the time data from said timer means by the correction time sensed by said correction time sensing means when the current time data from said current time counting means has been corrected by said correction means during the countdown operation of said timer means.

6. A time data receiving apparatus according to claim 5, wherein said correction means corrects the current time data every hour on the hour.

7. A time data receiving apparatus according to claim 5, wherein said correction means includes means for judging whether or not the time data has been received properly on the basis of intervals at which a plurality of reception time data have been obtained successively at said receiving means, and executes a correction of said current time data only when said correction means has judged that the time data has been received properly.

8. A time data receiving apparatus according to claim 5, further comprising specifying means for specifying whether or not time data in said different functional means should be corrected by said correction means, and wherein said correction means executes a correction of said current time data when said specifying means has specified that the time data in said different functional means should be corrected.

* * * * *